United States Patent
Kim et al.

(10) Patent No.: US 8,345,589 B2
(45) Date of Patent: Jan. 1, 2013

(54) METHOD AND APPARATUS FOR DETERMINING TIMING FOR INITIAL RANGING OF USER EQUIPMENT USING RANGING OF ADJACENT PIECES OF USER EQUIPMENT IN MULTI-HOP MOBILE RELAY SYSTEM

(75) Inventors: Hyun-Jae Kim, Incheon (KR); Young-Il Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 624 days.

(21) Appl. No.: 12/518,246

(22) PCT Filed: Oct. 31, 2007

(86) PCT No.: PCT/KR2007/005467
§ 371 (c)(1),
(2), (4) Date: Jun. 8, 2009

(87) PCT Pub. No.: WO2008/069457
PCT Pub. Date: Jun. 12, 2008

(65) Prior Publication Data
US 2009/0318166 A1   Dec. 24, 2009

(30) Foreign Application Priority Data
Dec. 8, 2006  (KR) .................. 10-2006-0125027

(51) Int. Cl.
*H04B 7/14* (2006.01)
(52) U.S. Cl. .................. 370/315; 455/456.1
(58) Field of Classification Search .................. 370/315; 455/456.1
See application file for complete search history.

(56) References Cited

U.S. PATENT DOCUMENTS
6,215,792 B1   4/2001   Abi-Nassif
2004/0174845 A1   9/2004   Koo et al.
2005/0041573 A1   2/2005   Eom et al.
2007/0082621 A1*   4/2007   Lee et al. .................. 455/69
2007/0147287 A1*   6/2007   Jalil et al. .................. 370/329

FOREIGN PATENT DOCUMENTS
| KR | 10-2003-0058589 | 7/2003 |
| KR | 10-2003-0064219 | 7/2003 |
| KR | 10-2003-0084243 | 11/2003 |
| KR | 10-2006-0063277 | 6/2006 |
| KR | 10-2006-0097508 | 9/2006 |
| KR | 10-2007-0061365 | 6/2007 |

* cited by examiner

OTHER PUBLICATIONS
International Search Report for PCT/KR2007/005467, mailed Feb. 11, 2008.

*Primary Examiner* — Sai-Ming Chan
(74) *Attorney, Agent, or Firm* — Staas & Halsey LLP

(57) ABSTRACT

Provided is a method and apparatus for determining timing for initial ranging of user equipment by using ranging of adjacent pieces of user equipment in a multi-hop mobile relay (MMR) system, and more particularly, a method and apparatus for determining timing for initial ranging of user equipment in which a power value and a timing value for periodic ranging of adjacent pieces of user equipment are measured so as to minimize an uplink timing error of a base station. In the MMR system, user equipment transmits an initial ranging code to the base station with irregular timing while not knowing an exact start point of an uplink of the base station. In particular, if the user equipment attempts the initial ranging at the same time as when adjacent pieces of user equipment attempt the periodic ranging and the handover ranging, an error occurs between transmission timing of the initial ranging and uplink timing, thereby acting as an inter-symbol interference (ISI) and inter-channel interference (ICI) of different ranging. As a result, the initial ranging acts as an interference signal in a ranging process of adjacent pieces of user equipment. However, the apparatus and method can minimize a timing error of the initial ranging code of user equipment by avoiding the initial ranging acting as the interference signal.

10 Claims, 8 Drawing Sheets

| POWER-DISTANCE TABLE | |
|---|---|
| MEASURED CODE POWER | SUBSTANTIAL DISTANCE |
| 1000~1500 | 10m |
| 1500~2000 | 20m |
| 2000~2500 | 30m |
| ⋮ | ⋮ |
| 2000~2500 | 30m |

METHOD AND APPARATUS FOR DETERMINING TIMING FOR INITIAL RANGING OF USER EQUIPMENT USING RANGING OF ADJACENT PIECES OF USER EQUIPMENT IN MULTI-HOP MOBILE RELAY SYSTEM

CROSS-REFERENCE TO RELATED PATENT APPLICATION

This application claims the benefit under 35 U.S.C. Section 371, of PCT International Application Number PCT/KR2007/005467, filed Oct. 31, 2007 and Korean Patent Application No. 10-2006-0125027, filed on Dec. 8, 2006, in the Korean Intellectual Property Office, the disclosure of which are incorporated herein in its entirety by reference.

BACKGROUND OF THE INVENTION

1. Field of the Invention

The present invention relates to a method and apparatus for determining timing for initial ranging of user equipment by using ranging of adjacent pieces of user equipment in a multi-hop mobile relay (MMR) system, and more particularly, to a method and apparatus for determining timing for initial ranging of user equipment in which a power value and a timing value for periodical ranging of adjacent pieces of user equipment are measured so as to minimize an uplink timing error of a base station. That is, the present invention relates to a method of properly selecting timing for initial ranging of user equipment in the MMR system and a computer-readable medium having embodied thereon a computer program for executing the method.

This work was supported by the IT R&D program of MIC/IITA. [2006-S-011-01, Development of relay/mesh communication system for multi-hop WiBro]

2. Description of the Related Art

In multi-hop mobile relay (MMR) systems, four ranging modes are defined which include initial ranging that initially uses a code division multiple access (CDMA) code and sends it to a base station in order for user equipment to attempt a call entry, periodic ranging that periodically reports a state of the user equipment to the base station after a call process is complete, bandwidth request ranging that allows the user equipment to request an uplink bandwidth to a scheduler of the base station, and handover ranging that attempts a handover.

In all communication systems having a base station that operates on the basis of a predetermined reference timing value, a time required for a signal that is transmitted from user equipment to reach the base station is estimated so as to regulate transmission timing for each piece of user equipment, and as a result, signals from all pieces of user equipment are received by the base station at the same timing. In order to achieve the aforementioned purpose when a piece of user equipment newly accesses a system, a series of processes are performed to measure a delayed time when a signal is transferred to the base station, which is called as an initial ranging process. Timing for an initial ranging signal does not coincide with timings for signals of other pieces of user equipment which have undergone the initial ranging process. Thus, the initial ranging signal may interfere with signals of other pieces of user equipment.

In general, while not knowing an exact uplink start point of the base station, user equipment that initially enters a call transmits an initial ranging code by using an initial timing value and a power value which are arbitrarily stored. After the initial ranging code is received, the base station measures the timing value and the power value of the initial ranging code and then transmits a response message of the initial ranging code to a next frame. In this case, a parameter of the response message broadcasts a modified timing value that can be adjusted according to uplink synchronization of the base station along with the received power value to the user equipment within a cell.

As described above, since the initial power value and the timing value are used in the initial ranging process without alteration, if the user equipment attempts the initial ranging at the same time as when other pieces of user equipment attempt periodic ranging and handover ranging, an error occurs between transmission timing of the initial ranging and uplink timing, thereby acting as inter-symbol interference (ISI) and inter-channel interference (ICI) of different ranging. As a result, the initial ranging acts as an interference signal in a ranging process of other pieces of user equipment. Accordingly, there is a problem in that a receiving rate of the base station is reduced with respect to a ranging signal of other pieces of user equipment.

SUMMARY OF THE INVENTION

The present invention provides a method and apparatus for determining timing for initial ranging of user equipment by using ranging of adjacent pieces of user equipment in a multi-hop mobile relay (MMR) system, wherein, in an Internet communication system, when particular user equipment attempts initial ranging, a start point of an uplink of a base station is predicted by using periodic ranging information of adjacent pieces of user equipment, and thereafter an initial ranging code of the user equipment is allowed to be transmitted according to uplink synchronization of the base station. Therefore, a problem of a deterioration in a code receiving rate of the base station can be solved, where the deterioration occurs at an initial ranging point of user equipment when other pieces of user equipment attempt periodic ranging and handover ranging, due to an interference signal which an initial timing acted as in a ranging process of other pieces of equipment due to an error of an initial timing point. This is because a timing error of an initial ranging code of user equipment can be minimized by measuring timing of adjacent raging and by using the measured timing.

According to an aspect of the present invention, there is provided an apparatus for determining timing for initial ranging of user equipment in an MMR system, the apparatus comprising: a target user equipment checking unit checking for second user equipment which exists adjacent to first user equipment in the same as first user equipment attempting the initial ranging and attempts different ranging than the initial ranging; a timing measuring unit measuring timing of the different ranging attempted by the second user equipment; and a timing determining unit determining timing of the initial ranging of the first user equipment according to the measured timing.

According to another aspect of the present invention, there is provided a method of determining timing for initial ranging of user equipment in an MMR system, the method comprising: checking for second user equipment which exists adjacent to first user equipment in the same as first user equipment attempting the initial ranging and attempts different ranging than the initial ranging; measuring timing of the different ranging attempted by the second user equipment; and determining timing of the initial ranging of the first user equipment according to the measured timing.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described with reference to the accompanying drawings so that those of ordinary skill in the art can easily implement the present invention.

Figure 1:
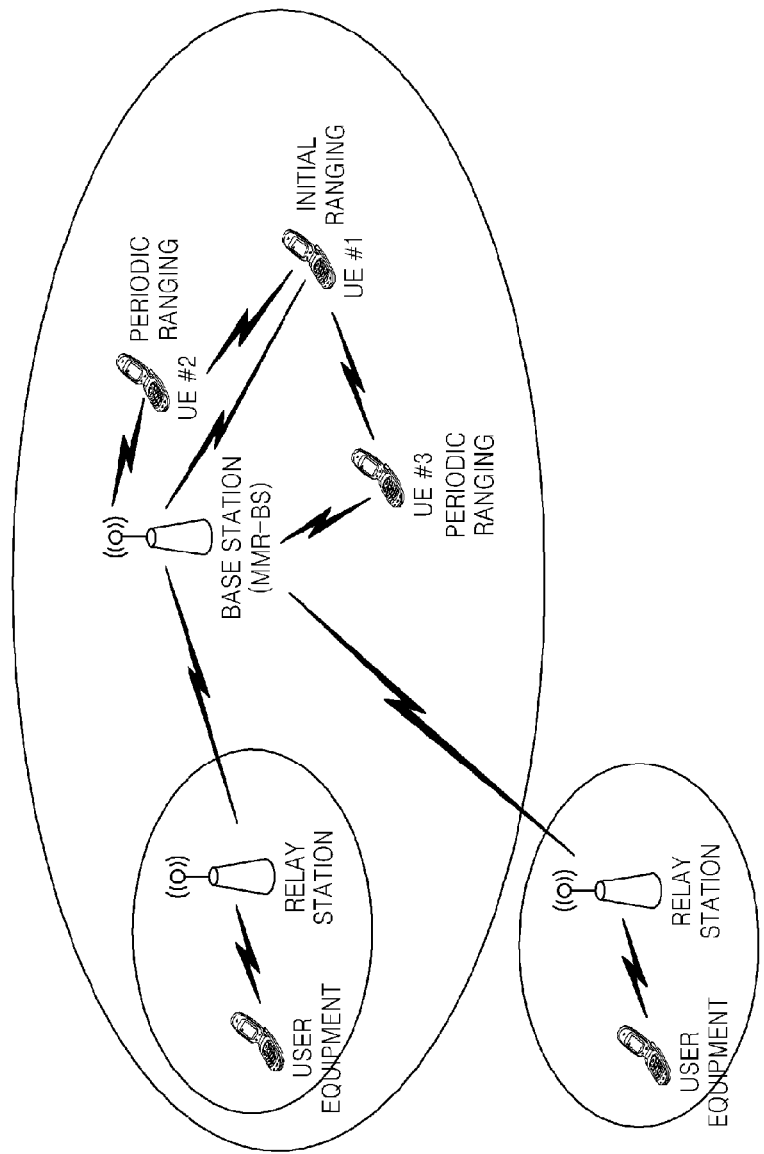
FIG. 1 illustrates a configuration of a system that transmits a ranging code between a base station and user equipment in a multi-hop mobile relay (MMR) system according to an embodiment of the present invention.

FIG. 1 illustrates a configuration of a system that transmits a ranging code between a base station and user equipment in a multi-hop mobile relay (MMR) system according to an embodiment of the present invention.

FIG. 1 is a schematic view of user equipment that attempts various types of ranging in the MMR system.

Referring to FIG. 1, in the MMR system, the ranging attempted by the user equipment affects adjacent pieces of user equipment. While not knowing an exact uplink start point of the base station, user equipment UE#1 transmits an initial ranging code to the base station with irregular timing. If user equipment UE#2 and UE#3 attempts periodic ranging and handover ranging when the user equipment UE#1 attempts initial ranging, due to an error between transmission timing of the initial ranging and uplink timing, the user equipment UE#1 acts as an inter-symbol interference (ISI) and an inter-channel interference (ICI) of different types of ranging, thereby acting as an interference signal in a ranging process of the user equipment UE#2 and UE#3.

That is, in the initial ranging attempted by the user equipment UE#1, transmission is carried out while the base station is not synchronized with the uplink timing, and thus the periodic ranging transmitted by the user terminal UE#2 and UE#3 may be affected. In particular, when many pieces of user equipment exist in one cell, due to the influence of the ISI and the ICI, the receiving capability of the base station for periodic ranging of corresponding user equipment may further deteriorate.

User equipment that has attempted initial ranging measures a ranging timing value transmitted from its adjacent pieces of user equipment and waits for a response of ranging with respect to a code transmitted by the user equipment. When the response is received, an uplink timing control value and a power value of the user equipment's response message are used to perform a call process. In particular, since the response to the ranging code is broadcast to all pieces of user equipment existing in the cell, responses for initial ranging, periodic ranging, bandwidth request ranging, and handover ranging of adjacent pieces of user equipment can all be received. By utilizing such characteristics, a method is proposed in which periodic ranging transmitted by user equipment according to the uplink synchronization of the base station is used as an initial value for initial ranging of particular user equipment. A detailed configuration thereof will be described with reference to the following drawings.

Figure 2:
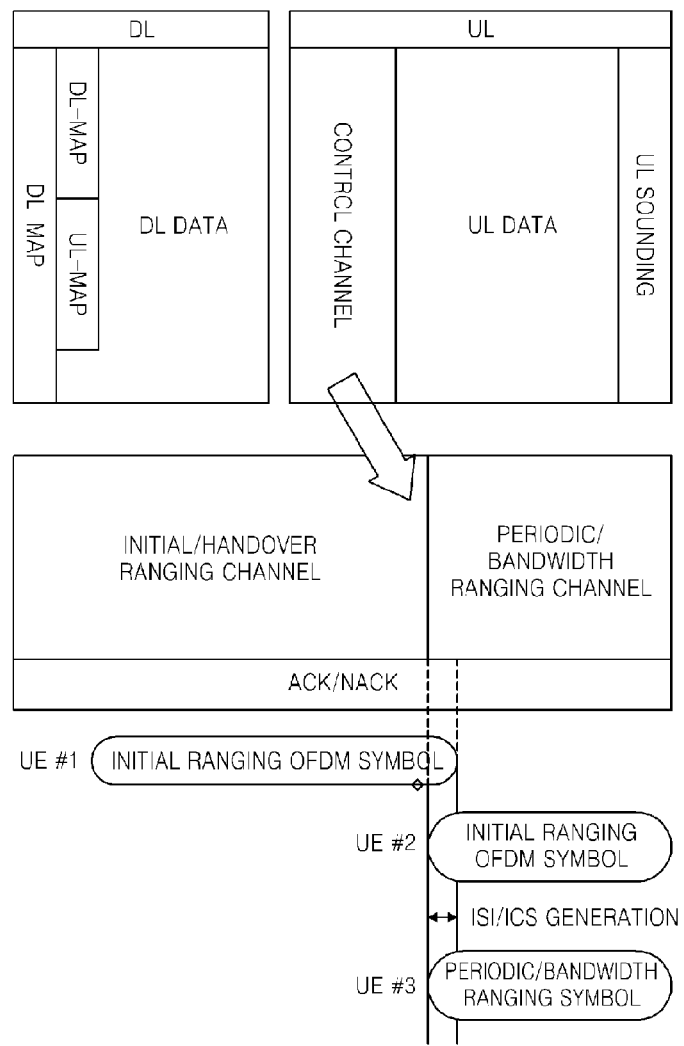
FIG. 2 illustrates frame structures based on types of ranging codes in an MMR system according to an embodiment of the present invention.

FIG. 2 illustrates frame structures based on types of ranging codes in an MMR system according to an embodiment of the present invention.

Referring to FIG. 2, an uplink (UL) control channel of the present invention is constructed so that initial ranging and handover ranging use two symbols in a front portion of the UL control channel, and periodic ranging and bandwidth ranging use only one symbol since transmission is carried out according to UL synchronization by performing the initial ranging. This shows that, if timing is not correct in the UL control channel when the user equipment UE#1 attempts the initial ranging, a ranging receiving rate may deteriorate at the base station since the ISI and the ICI occur at the user equipment UE#2 and UE#3 which attempts periodic ranging or bandwidth ranging.

Figure 3:
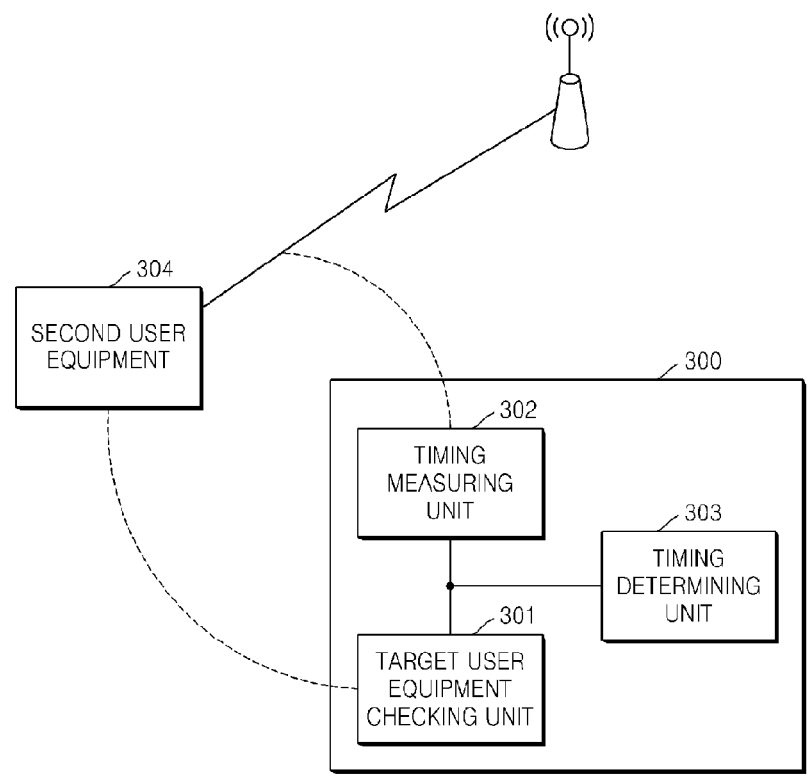
FIG. 3 illustrates a configuration of an apparatus for determining timing for initial ranging of user equipment by using ranging of adjacent pieces of user equipment in an MMR system according to an embodiment of the present invention.

FIG. 3 illustrates a configuration of an apparatus for determining timing for initial ranging of user equipment by using ranging of adjacent pieces of user equipment in an MMR system according to an embodiment of the present invention.

Referring to FIG. 3, an apparatus 300 for determining timing for initial ranging of user equipment includes a target user equipment checking unit 301 which checks for second user equipment 304 which exists adjacent to first user equipment in the same as first user equipment attempting initial ranging and attempts different ranging than the initial ranging, a timing measuring unit 302 which measures timing of the different ranging attempted by the second user equipment 304, and a timing determining unit 303 which determines timing for initial ranging of the first user equipment according to the measured timing. In this case, the different ranging attempted by the second user equipment 304 is periodic ranging that periodically reports a state of the second user equipment 304 to the base station.

The timing measuring unit 302 measures a power value of the different ranging while measuring the timing of the different ranging attempted by the second user equipment 304, and stores the measurement result in a database (DB). The timing determining unit 303 determines a timing value for ranging having the greatest power value from among power values of the different ranging stored in the DB as a timing value for initial ranging of the first user equipment.

If the measured power value of the different ranging is greater than a predetermined threshold value, the timing measuring unit 302 stores the power value and the timing value for the different ranging in the DB. The predetermined threshold value is defined as a value that shows that the second user equipment 304 subjected to timing measurement has to be spaced apart from first user equipment by more than a specific distance. The predetermined threshold value is determined by using a distance-correlation between a power value and a measuring area of the power level. However, if the second user equipment 304 is not found, the timing value for initial ranging that is initially received by the first user equipment is determined as the timing value for the initial ranging of the first user equipment.

In order to determine the timing value even more accurately, a timing regulating unit is provided to receive a response message of the base station for the different ranging attempted by the second user equipment 304, thereby regulating the timing value for initial ranging of the first user equipment.

The apparatus 300, which determines timing for initial ranging of user equipment by using ranging of adjacent pieces of user equipment in the aforementioned MMR system, may exist in the first user equipment or may be the first user equipment itself.

Figure 4:
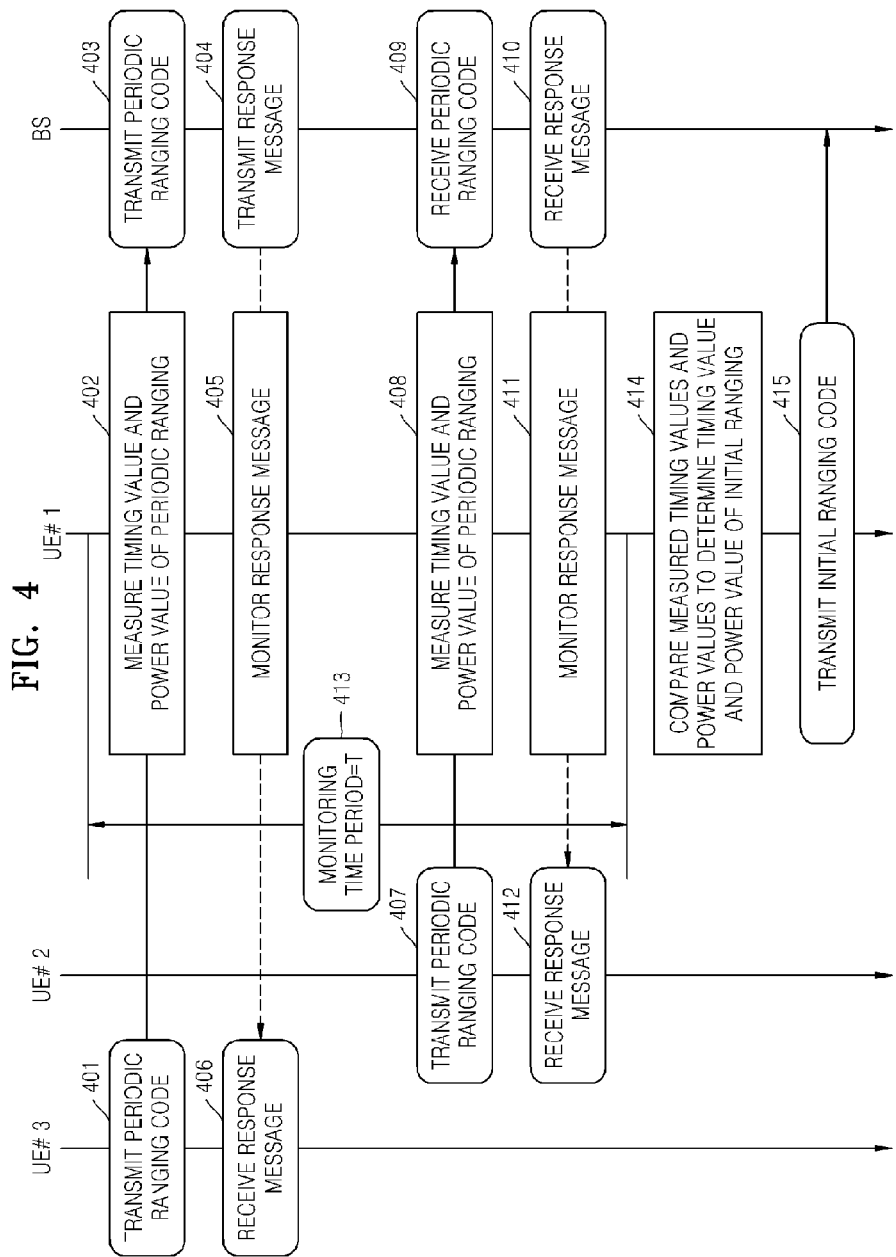
FIG. 4 illustrates a call process using ranging of adjacent pieces of user equipment in user equipment attempting initial ranging according to an embodiment of the present invention.

FIG. 4 illustrates a call process using ranging of adjacent pieces of user equipment in user equipment attempting initial ranging according to an embodiment of the present invention.

Referring to FIG. 4, the user equipment UE#2 and UE#3 transmits a periodic ranging code (operations 401 and 407). The user equipment UE#1 attempting initial ranging measures the timing value and the power value of the periodic ranging code (operations 402 and 408). After values of necessary parameters are stored, the timing value and the power value are received by Base Station (operations 403 and 409). A timing regulation value of the periodic ranging code is broadcast from the base station (operations 404 and 410). The timing regulation value is monitored and stored (operations 405 and 411). The above series of operations are performed for a monitoring time period T (operation 413), and in operation 413, values of parameters are determined to be used in the initial ranging attempt.

That is, when the user equipment UE#1 measures the timing value and the power value of the periodic ranging transmitted to the base station by the user equipment UE#2 and UE#3, and a response message of the base station for the periodic ranging is transmitted to the user equipment UE#2 and UE#3 (operations 406 and 412), the response message is also transmitted to the user equipment UE#1. The received response message is compared with the measured timing value and the power value so as to determine a timing value and a power value of the initial ranging (operation 414). By using the determined timing value and the power value, the user equipment UE#1 transmits the initial ranging code to the base station (operation 415).

Figure 5:
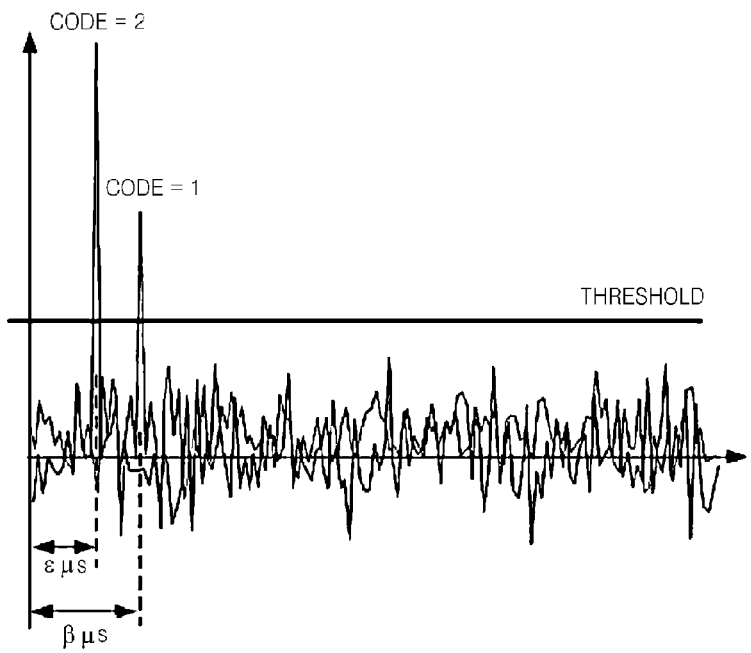
FIG. 5 illustrates measured values of periodic ranging transmitted by adjacent pieces of user equipment and stored in a database (DB) according to an embodiment of the present invention.

FIG. 5 illustrates measured values of periodic ranging transmitted by adjacent pieces of user equipment and stored in a DB according to an embodiment of the present invention.

Referring to FIG. 5, as shown in a graph, user equipment stores a code value, a measured power value, and a measured timing value in a table form when the measured power value of a ranging code of its adjacent pieces of user equipment exceeds a threshold value.

That is, a correlation is examined for the periodic ranging codes transmitted by the adjacent pieces of user equipment, and when a power value exceeds the threshold value, the measured timing value along with a power value and a timing value for each code are stored in the DB. Accordingly, ranging values having the greatest power values from among the stored values are determined as the power value and the timing value for the initial ranging of the user equipment.

Figure 6:
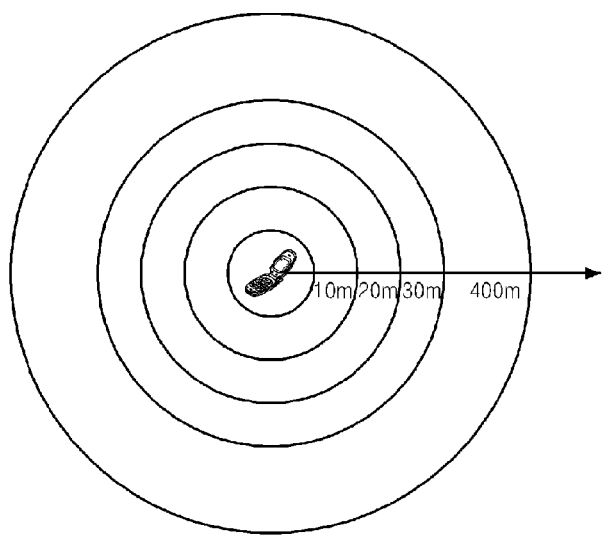
FIG. 6 illustrates a relational table between a ranging measuring power value and a distance according to an embodiment of the present invention.

FIG. 6 illustrates a relational table between a ranging measuring power value and a distance according to an embodiment of the present invention.

The table shows a relationship between the ranging measuring power value and the distance, wherein the relationship is created through a preliminary study for power values measured at various distances. In order to determine a threshold value, a periodic ranging code is measured in advance at various distances. A measured power value of the periodic ranging code is statistically analyzed and is stored in a table. As a result, it is possible to determine a degree of usage about the periodic ranging code of the adjacent pieces of user equipment. In addition, the table can be continuously managed by user equipment.

The table is required in order to select a code of the closest user equipment in comparison with the code power value measured in FIG. 5 and to attempt initial ranging according to the measured timing for ranging of the code.

Figure 7:
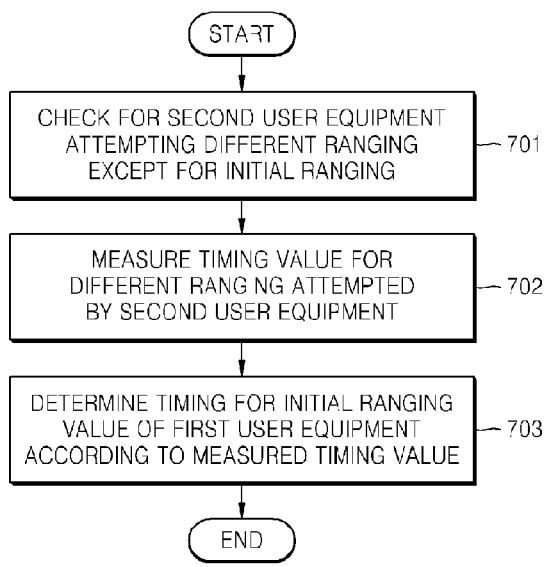
FIG. 7 is a flowchart of a method of determining timing for initial ranging of user equipment by using adjacent pieces of user equipment in an MMR system according to an embodiment of the present invention.

FIG. 7 is a flowchart of a method of determining timing for initial ranging of user equipment by using adjacent pieces of user equipment in an MMR system according to an embodiment of the present invention.

Referring to FIG. 7, the second user equipment 304 is checked for which exists adjacent to first user equipment in the same as the first user equipment attempting initial ranging and attempts different ranging than the initial ranging (operation 701). A timing value for the different ranging is measured which is attempted by the second user equipment 304 (operation 702). According to the measured timing value, a timing value for initial ranging of the first user equipment is determined (operation 703). In this case, the different ranging of the second user equipment 304 is periodic ranging that is used to periodically report a state of the second user equipment 304 to the base station.

In order to measure a timing value even more accurately, a process is required whereby a response message of the base station is received for the different ranging attempted by the second user equipment 304, thereby regulating the timing value for the initial ranging of the first user equipment. That is, the first user equipment stores a value of one selected periodic ranging code and thereafter undergoes a process in which a timing point of the initial ranging is regulated by monitoring a response message transmitted from the base station to a next frame.

Figure 8:
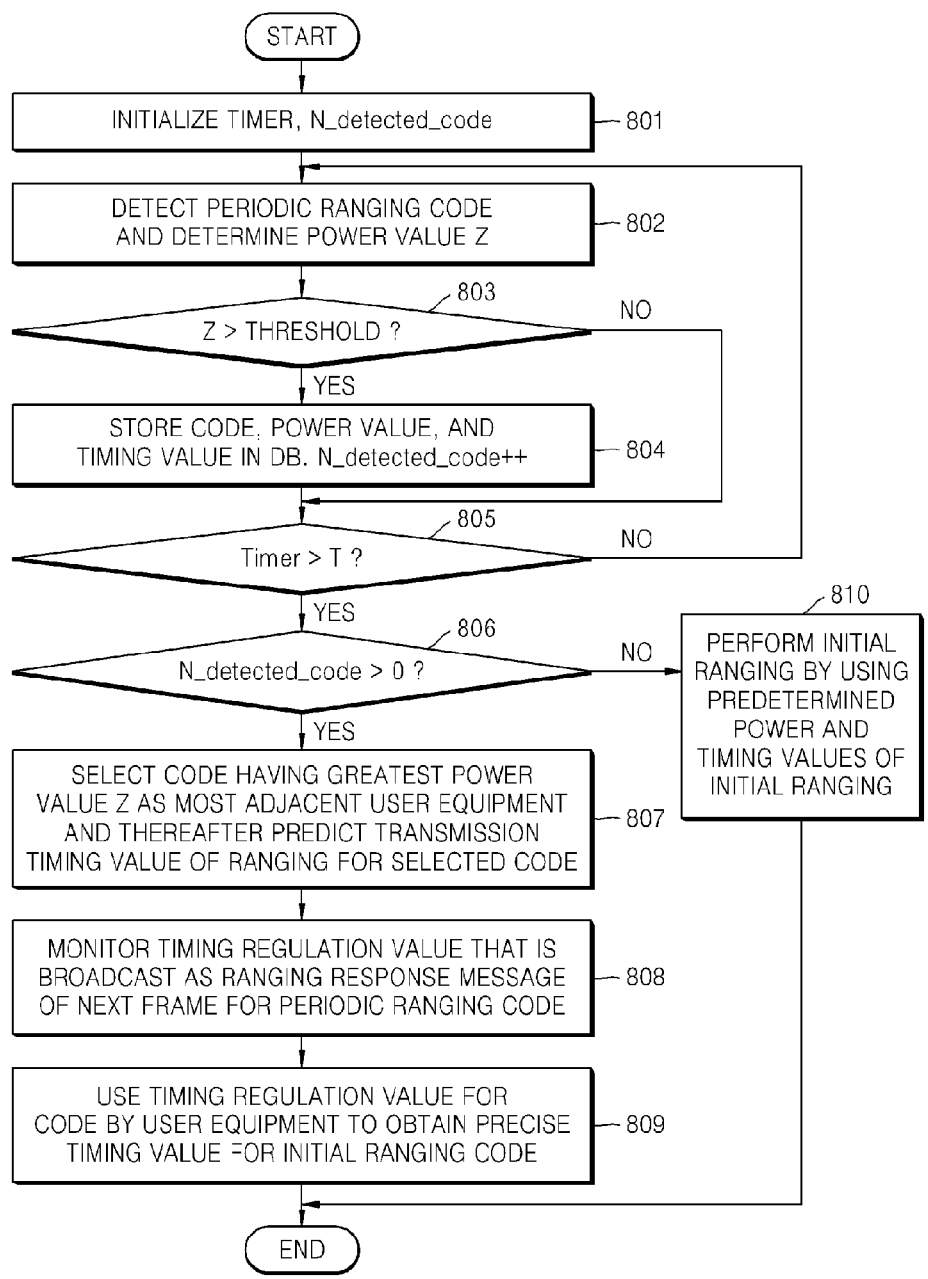
FIG. 8 is a detailed flowchart of an initial ranging process performed by user equipment according to an embodiment of the present invention.

FIG. 8 is a detailed flowchart of an initial ranging process performed by user equipment according to an embodiment of the present invention.

The initial ranging process performed by user equipment according to this embodiment of the present invention will now be described with reference to FIG. 8. After initial values are initialized (operation 801), the user equipment determines a threshold value indicating a power value to be used as a reference value for measurement (operation 802).

Next, in order to determine initial power and timing values for transmitting an initial ranging code, the user equipment checks for the presence of a code which has a power value Z of the periodic ranging code greater than the threshold value (operation 803). If there is a code having the power value Z greater than the threshold value, the code, the power value, and the timing value are stored in the DB. Thereafter, a value N_detected_code is incremented (operation 804).

This operation is performed during a specific time T (operation 805). The loop is performed for the code having the power value Z greater than the threshold value of a frame. If N_detected_code>0 (operation 806), a code having the greatest power value Z is selected as the most adjacent user equipment. Thereafter, a transmission timing value for periodic ranging of user equipment is predicted for the code (operation 807). A timing regulation value that is broadcast as a ranging response message of a next frame is monitored for the periodic ranging code (operation 808). The user equipment use controls the timing regulation value for the code so as to obtain a precise timing value for the initial ranging code (operation 809).

If N_detected_code=0, the initial ranging is performed by using predetermined power and timing values of the initial ranging (operation 810).

According to the present invention, in an Internet communication system, when particular user equipment attempts initial ranging, a start point of an uplink of a base station is predicted by using periodic ranging information of adjacent pieces of user equipment, and thereafter an initial ranging code is allowed to be transmitted according to an uplink synchronization of the base station. Therefore, if a code is transmitted to the base station with irregular timing when a piece of user equipment attempts initial ranging, the initial ranging can be prevented from acting as an interference signal in a ranging process of other pieces of user equipment which conventionally occurs since the initial ranging acts as an inter-symbol interference (ISI) and inter-channel interference (ICI) of different ranging. As a result, without having to use an additional device or apparatus, it is possible to minimize a timing error of the initial ranging code.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. An apparatus for determining timing for initial ranging of user equipment in an MMR (multi-hop mobile relay) system, the apparatus comprising:
   a target user equipment checking unit checking for second user equipment which exists adjacent to first user equipment in the same as first user equipment attempting the initial ranging and attempts different ranging than the initial ranging;
   a timing measuring unit measuring timing of the different ranging attempted by the second user equipment; and
   a timing determining unit determining timing of the initial ranging of the first user equipment according to the measured timing,
   wherein, when the target user equipment checking unit checks for one or more pieces of second user equipment attempting the different ranging than the initial ranging for a predetermined time period, the timing measuring unit measures the timing of the different ranging attempted by the found second user equipment and stores the timing measurement result of the measurement of the timing of the different ranging attempts in a DB (database).

2. The apparatus of claim 1, wherein the timing measuring unit measures a power value of the different ranging while measuring the timing of the different ranging attempted by the second user equipment, and stores the measurement result in the DB, and wherein the timing determining unit determines a timing value for ranging, which has the greatest power value among power values of the different ranging stored in the DB, as a timing value for the initial ranging of the first user equipment.

3. An apparatus for determining timing for initial ranging of user equipment in an MMR (multi-hop mobile relay) system, the apparatus comprising:
   a target user equipment checking unit checking for second user equipment which exists adjacent to first user equipment in the same as first user equipment attempting the initial ranging and attempts different ranging than the initial ranging;
   a timing measuring unit measuring timing of the different ranging attempted by the second user equipment; and
   a timing determining unit determining timing of the initial ranging of the first user equipment according to the measured timing,
   wherein, when the target user equipment checking unit checks for one or more pieces of second user equipment attempting the different ranging than the initial ranging for a predetermined time period, the timing measuring unit measures the timing of the different ranging attempted by the found second user equipment and stores the measurement result in a DB (database),
   wherein the timing measuring unit measures a power value of the different ranging while measuring the timing of the different ranging attempted by the second user equipment, and stores the measurement result in the DB, and wherein the timing determining unit determines a timing value for ranging, which has the greatest power value among power values of the different ranging stored in the DB, as a timing value for the initial ranging of the first user equipment,
   wherein the timing measuring unit stores the power value and the timing value of the different ranging in the DB when the measured power value of the different ranging exceeds a predetermined threshold value.

4. The apparatus of claim 3, wherein the predetermined threshold value is a value showing that the second user equipment subjected to timing measurement has to be spaced apart from first user equipment by more than a specific distance and is predetermined by using a distance-correlation between the power value and a measuring area of the power value.

5. The apparatus of claim 1, wherein, if there is no second user equipment checked for by the target user equipment checking unit, the timing determining unit determines the timing value for the initial ranging that is initially assigned to the first user equipment as the timing value of the initial ranging of the first user equipment.

6. The apparatus of claim 1, wherein the apparatus exists in the first user equipment or is the first user equipment itself.

7. A method of determining timing for initial ranging of user equipment in an MMR (multi-hop mobile relay) system, the method comprising:
   (a) checking for second user equipment which exists adjacent to first user equipment in the same system as first user equipment attempting the initial ranging and attempts different ranging than the initial ranging;

(b) measuring timing of the different ranging attempted by the second user equipment; and
(c) determining timing of the initial ranging of the first user equipment according to the measured timing, wherein, when one or more pieces of second user equipment attempting the different ranging than the initial ranging for a predetermined time period are checked in (a), the timing of the different timing ranging attempted by the checked second user equipment is measured and the timing measurement result of the measurement of the timing of the different ranging attempts is stored in a DB (database) in (b).

8. The method of claim 7, wherein, in (b), a power value of the different ranging is measured while measuring the timing of the different ranging attempted by the second user equipment, and is stored in the DB, and wherein, in (c), a timing value for ranging, which has the greatest power value from among power values of the different ranging stored in the DB, is determined as a timing value for the initial ranging of the first user equipment.

9. A method of determining timing for initial ranging of user equipment in an MMR (multi-hop mobile relay) system, the method comprising:

(a) checking for second user equipment which exists adjacent to first user equipment in the same system as first user equipment attempting the initial ranging and attempts different ranging than the initial ranging;

(b) measuring timing of the different ranging attempted by the second user equipment; and (c) determining timing of the initial ranging of the first user equipment according to the measured timing, wherein, when one or more pieces of second user equipment attempting the different ranging than the initial ranging for a predetermined time period are checked in (a), the timing of the different ranging attempted by the checked second user equipment is measured and stored in a DB (database) in (b), wherein, in (b), a power value of the different ranging is measured while measuring the timing of the different ranging attempted by the second user equipment, and is stored in the DB, and wherein, in (c), a timing value for ranging, which has the greatest power value from among power values of the different ranging stored in the DB, is determined as a timing value for the initial ranging of the first user equipment, wherein, in (b), the power value and the timing value of the different ranging are stored in the DB when the measured power value of the different ranging exceeds a predetermined threshold value.

10. The method of claim 9, wherein the predetermined threshold value is a value that shows that the second user equipment subjected to timing measurement has to be spaced apart from first user equipment by more than a certain distance and is predetermined by using a distance-correlation between the power value and a measuring area of the power value.

* * * * *